United States Patent [19]

Gloyer

[11] 3,898,287

[45] Aug. 5, 1975

[54] DECOLORIZATION OF CARBONYL COMPOUNDS

[75] Inventor: Stewart E. Gloyer, Arlington Heights, Ill.

[73] Assignee: Kraftco Corporation, Glenview, Ill.

[22] Filed: Feb. 12, 1973

[21] Appl. No.: 331,476

[52] U.S. Cl............................ 260/593 P; 260/601 R
[51] Int. Cl.............................................. C07c 49/04
[58] Field of Search.......... 260/593 R, 593 P, 601 R

[56] References Cited
UNITED STATES PATENTS
2,204,956   6/1940   Bresler et al.......................... 202/57

*Primary Examiner*—Bernard Helfin
*Assistant Examiner*—James H. Reamer
*Attorney, Agent, or Firm*—Fitch, Even, Tabin & Luedeka

[57] ABSTRACT

A method is provided for decolorizing carbonyl compounds. In the method the carbonyl compound is contacted with a decolorizing agent which is a combination of a diamine and a trialkyl phosphite. A decolorized carbonyl product is recovered by distillation of the carbonyl compound.

10 Claims, No Drawings

DECOLORIZATION OF CARBONYL COMPOUNDS

The present invention relates generally to the decolorizing of carbonyl compounds and, more particularly, relates to the preparation of carbonyl compounds which are lightly colored.

Various processes are known for the preparation of carbonyl compounds from olefin charge stocks. The Consortium process has been developed for the preparation of carbonyl compounds by the oxidation of ethylenically unsaturated hydrocarbons and, in particular, for the preparation of acetaldehyde from ethylene. In the Consortium process, acetaldehyde is prepared from ethylene by a process wherein ethylene is contacted with an oxygen-containing gas in the presence of a compound of a metal of the platinum group and an oxidizing agent having an oxidation potential higher than that of the platinum group metal. The Consortium process is particulary applicable to the use of low molecular weight, gaseous olefins, such as ethylene and propylene, wherein the carbonyl compound produced leaves the reaction zone in the gaseous phase. the Consortium process is also used to prepare liquid carbonyl compounds from liquid olefin charge stocks. Generally, olefins having 5 or more carbon atoms per molecule are liquid. In the preparation of liquid carbonyl compounds from liquid olefin charge stock, the olefin charge stock is mixed with a solution of the platinum group metal and the oxidizing agent. The reaction is effected by stirring and heating the reaction mixture while bubbling an oxidizing agent and an oxygencontaining gas through the reaction mixture. The carbonyl compound is then removed from the reaction mixture by decantation or other suitable means.

An improved method for the preparation of liquid carbonyl compounds for liquid olefin charge stocks is disclosed in U.S. Pat. application, Ser. No. 113,627 now abandoned, to Gloyer et al. the contents of which are incorporated herein by reference. In the process of this patent application, a carbonyl compound is prepared from an umsaturated olefin hydrocarbon charge stock having at least 5 carbon atoms per molecule. A reaction mixture is provided including the charge stock, a catalyst system and a high boiling solvent. The reaction mixture is heated with stirring to effect a substantial conversion of the unsaturated olefin hydrocarbon to a carbonyl compound. Thereafter, a reaction product, including the carbonyl compound, is separated from the catalyst system and other components of the reaction mixture by distillation. In a preferred embodiment of the application, the reaction mixture includes a low boiling solvent, as well as a high boiling solvent.

A particular problem which has been encountered in the manufacture of liquid carbonyl compounds is the tendency to produce darkly colored by-products during the manufacturing process. For most uses of the carbonyl compound, it is desired that the carbonyl compound have as light a color as possible and a water white carbonyl compound is most desirable. It would be desirable to provide a method for decolorizing carbonyl compounds. It would furthermore be desirable to provide a method for the preparation of carbonyl compounds from olefins which are lightly colored.

Accordingly, it is a principal object of the present invention to provide a method for decolorizing carbonyl compounds. It is another object of the present invention to provide a method for the manufacture of lightly colored carbonyl compounds from olefins. These and other objects of the present invention will become more apparent from the following detailed disclosure and the accompanying claims.

Generally, in accordance with various features of the present invention, a method is provided for decolorizing carbonyl compounds. In the method, the carbonyl compound is contacted with a decolorizing agent selected from diamines, trialkyl phosphites and mixtures thereof for a predetermined time. Thereafter, a decolorized carbonyl product is recovered by distillation of the carbonyl compound.

The diamine is selected from organic diamines which are soluble in the carbonyl compound and which have the amine groups on adjacent carbon atoms. Aliphatic diamines having a carbon chain length of from $C_2$ to $C_6$ are preferable. However, aromatic diamines wherein the amine groups are on adjacent carbon atoms, such as ortho-phenylene diamine, may be used. For the reasons of economy and availability, ethylene diamine is particularly preferred. The diamine when used alone as the decolorizing agent of the present invention is used at a level of from about 0.01 to about 1 precent by weight of the carbonyl compound.

The trialkyl phosphite is selected from trialkyl phosphite compounds which are liquid and which are soluble in the carbonyl compound. The alkyl groups may be the same or different. The preferred alkyl groups are level of from about 0.01 to about 1 percent by weight of the carbon compound. Particularly preferred trialkyl phosphites, for reasons of economy and availability, are thriethyl phosphite, triisopropyl phosphite, tributyl phosphite, trisooctyl phosphite and mixtures thereof.

In practicing the method of the present invention, the decolorizing agent is added to the carbonyl compound to provide a reaction mixture. The reaction mixture is then heated and stirred for a period of time sufficient to decolorize the carbonyl compound. In general, a period of time of from about 5 minutes to about 1 hour is sufficient to effect the decolorization, although shorter and longer periods may sometimes be used. Thereafter, a decolorized carbonyl compound is removed from the reaction mixture by distillation. The color bodies remain behind and the distillation is continued to a point to effect a maximum recovery of the carbonyl compound without boiling the reaction mixture to dryness.

While the use of the diamine alone or the trialkyl phosphite alone, if used at a high enough level, results in decolorization of the carbonyl compound, it has been discovered that a combination of diamine and trialkyl phosphite provides a synergistic decolorizing agent. A combination of the diamine and trialkyl phosphite may be used to lower levels than the individual components of the combination. The use of the combination results in a more effective decolorization of the carbonyl compound.

The reaction of the diamine with the carbonyl compound may result in the presence of moisture. A substantial level of moisture is not desirable if a trialkyl phosphite is also used in the decolorizing process. The presence of moisture tends to hydrolyze or otherwise decompose or interfere with the action of trialkyl phosphite in effecting the decolorizing reaction of the present invention. Consequently, when a combination of diamine and trialkyl phosphite is used, it is preferred to use the combination in sequence with an intermediate distillation step to remove any moisture which may have formed. The diamine is added first to the carbonyl compound. Thereafter, the mixture of carbonyl compound and diamine is heated for a suitable period of time, which is usually in the range of about 5 minutes to about 1 hour. Distillation is then effected to remove any moisture which may be present or which may have been formed during the diamine reaction. Thereafter, the trialkyl phosphite is added to the carbonyl compound and a further heating step is effected. The second heating period takes place for a period of time of from about 5 minutes to about 1 hour. Thereafter a decolorized carbonyl compound is obtained by distillation, as previously described.

Both the heating step in the presence of the diamine and in the presence of the trialkyl phosphite are effected at a temperature in the range of from about 50°C to about 150°C. Lower temperatures may be used but require longer times. Higher temperatures may be used but are not desirable in that the effeciency of the decolorization may be effected. If a temperature close to the boiling temperature of the diamine, trialkyl phosphite or carbonyl compound, is used the heating should be effected under reflux conditions.

When used in combination, it is preferred to use the diamine at a level of from about .005 to about 0.50 percent by weight of the carbonyl compound and the trialkyl phosphite at a level of from about 0.005 to about 0.50 percent by weight of the carbonyl compound. Levels of use of the diamine and trialkyl phosphite, whether alone or in combination, lower than the stated ranges produce no appreciable decolorization effect. Levels of use higher than the stated ranges may be used but do not provide my further improvement in color and are uneconomical.

The method of the present invention may be used to treat any carbonyl compound which is liquid at the temperature of treatment. In general, carbonyl compounds having a carbon chain length of 5 to 20 carbon atoms may be treated. The carbonyl compound is usually prepared from unsaturated hydrocarbons having from 5 to 20 carbon atoms per molecule and wherein the unsaturation in the hydrocarbon resides solely in from 1 to 4 olefinic double bonds and wherein there is at least 1 hydrogen atom on eah carbon atom of at least one of the olefinic double bonds.

The process of the present invention for decolorizing carbonyl compounds may be incorporated in the process for the manufacture of the carbonyl compounds. As previously described, the Consortium process involves the reaction of an unsaturated olefin charge stock with a solution of a platinum group metal catalyst and an oxidizing agent while oxygen-containing gas is bubbled through the reaction mixture. Thereafter, the carbonyl compound formed during the reaction is separated from the reaction mixture by decantation or other suitable means. A diamine or trialkyl phosphite is then added to the carbonyl-containing portion of the decantation. The mixture is then heated, as previously described. Moisture is then removed by distillation. Thereafter, if a diamine is used first, trialkyl phosphite may be added to the carbonyl-containing compound. Further heating is effected and a decolorized carbonyl compound is recovered by distillation.

The following example further illustrates various features of the invention but are intended in no way to limit the scope of the invention which is defined in the appended claims.

EXAMPLE 1

A ketone was produced by the oxidation of 1-decene using a palladium chloride/copper chloride catalyst. The 2-decanone carbonyl product, water, and a solvent were separated from the catalyst solution by distillation. Aqueous sodium hydroxide was added to neutralize the carbonyl product to a pH of 7. a carbonyl product was then separated from the neutralized mixture by decantation and was further distilled to separate residual amounts of water and solvent. The 2-decanone carbony product that was obtained had a yellow color. The crude 2-decanone product was separated product was separated into 16 samples and each of the samples was treated as set forth in Table I below.

As indicated in Table I, various of the samples were treated by the use of ethylene diamine alone. The indicated amount of ethylene diamine was added to the 2-decanone. The resulting solution was heated at a temperature of 110°C for 30 minutes and the product was distilled.

Also, various of the samples were treated by the use of trialkyl phosphite alone. The trialkyl phosphite, as indicated in Table I below, was added to the 2-decanone and the solution was heated at 110°C for 30 minutes. A product was obtained by distillation.

When the diamine and the trialkyl phosiphite were used in combination, as set forth in Table I, the diamine was first added to the 2-decanone and the solution was heated at 110°C for 30 minutes. The phosphite was then added to the solution and the solution was again heated for an additional 30 minutes at 110°C. A 2-decanone product was obtained by distillation.

TABLE I

DECOLORIZATION OF CRUDE 2-DECANONE

| SAMPLE NO. | PHOSPHITE USED | WEIGHT PERCENT OF PHOSPHITE | DIAMINE USED | WEIGHT PERCENT OF DIAMINE | COLOR OF DISTILLED PRODUCT |
|---|---|---|---|---|---|
| 1 | None | — | None | — | Yellow |
| 2 | None | — | Ethylene Diamine | 0.05 | Slightly Yellow |
| 3 | None | — | Ethylene Diamine | 0.10 | Slightly Yellow |
| 4 | None | — | Ethylene Diamine | 0.20 | Water White |
| 5 | None | — | ortho-Phenylene Diamine | 0.05 | Yellow |
| 6 | None | — | ortho-Phenylene Diamine | 0.10 | Water White |
| 7 | Tri-Butyl Phosphite | 0.60 | None | — | Yellow |
| 8 | Tri-Butyl Phosphite | 0.80 | None | — | Slightly Yellow |
| 9 | Tri-Butyl Phosphite | 0.90 | None | — | Water White |
| 10 | Tri-Butyl Phosphite | 0.30 | Ethylene Diamine | 0.05 | Slightly Yellow |
| 11 | Tri-Butyl Phosphite | 0.50 | Ethylene Diamine | 0.05 | Water White |

TABLE I—Continued

DECOLORIZATION OF CRUDE 2-DECANONE

| SAMPLE NO. | PHOSPHITE USED | WEIGHT PERCENT OF PHOSPHITE | DIAMINE USED | WEIGHT PERCENT OF DIAMINE | COLOR OF DISTILLED PRODUCT |
|---|---|---|---|---|---|
| 12 | Tri-Butyl Phosphite | 0.10 | Ethylene Diamine | 0.10 | Water White |
| 13 | Tri-Ethyl Phosphite | 0.50 | None | — | Slightly Yellow |
| 14 | Tri-Ethyl Phosphite | 0.70 | None | — | Water White |
| 15 | Tri-Ethyl Phosphite | 0.08 | Ethylene Diamine | 0.10 | Slightly Yellow |
| 16 | Tri-Ethyl Phosphite | 0.1 | Ethylene Diamine | 0.10 | Water White |

As can be seen from Table I, the combination of a diamine and a trialkyl phosphite can be used at levels lower than the diamine or trialkyl phosphite alone to effect decolorization of ketones. As can also be seen from Table I, the diamine or the phosphite aline, if used at a sufficiently high level, can be used to effect decolorization of the ketone.

What is claimed is:

1. A method for decolorization of carbonyl compounds manufactured from ethylenically unsaturated liquid olefin hydrocarbons having a carbon chain length of $C_5$ to $C_{20}$ by contacting the hydrocarbon with an oxygen containing gas in the presence of a compound of a metal of the platinum group and an oxidizing agent having an oxidation potential higher than that of the platinum group metal comprising adding a diamine selected from the group consisting of a diamine having a carbon chain lenght of from $C_2$ to $C_6$ and ortho-phenylene diamine and a trialkyl phosphite wherein the alkyl groups have carbon chain lengths of from $C_1$ and $C_8$ to said carbonyl compounds, said diamine having said amine groups on adjacent carbon atoms, said diamine and said trialkyl phosphite compound being soluble in said carbonyl compound, heating said mixture of said carbonyl compound in the presence of said diamine and said trialkyl phosphite and distilling a decolorized carbonyl compound from said mixture, said carbonyl compound being liquid at the temperature to which said mixture is heated.

2. A method in accordance with claim 1 wherein said diamine is ethylene diamine.

3. A method in accordance with claim 1 wherein said diamine is ortho-phenylene diamine.

4. A method in accordance with claim 1 wherein said trialkyl phosphite is selected from the group consisting of triethyl phosphite, triisopropyl phosphite, tributyl phosphite, triisooctyl phosphite and mixtures thereof.

5. A method in accordance with claim 1 wherein said trialkyl phosphite is tributyl phosphite.

6. A method in accordance with claim 1 wherein said trialkyl phosphite is triethyl phosphite.

7. A method in accordance with claim 1 wherein said diamine and said trialkyl phosphite are added in sequence to said carbonyl compound and wherein said mixture of said diamine and said carbonyl compound are heated prior to addition of trialkyl phosphite.

8. A method in accordance with claim 1 wherein said heating of said mixture is at a temperature of from about 50°C to about 150°C.

9. A method in accordance with claim 1 wherein said heating of said carbonyl compound is for a period of time of from about 5 to about 1 hour.

10. A method in accordance with claim 1 wherein said diamine is added to said carbonyl compound at a level of from about 0.005 to about 0.50 percent by weight and said trialkyl phosphite is added to said carbonyl compound at a level of about b 0.005 to about 0.5 percent by weight of carbonyl compound.

* * * * *

UNITED STATES PATENT AND TRADEMARK OFFICE
CERTIFICATE OF CORRECTION

PATENT NO. : 3,898,287
DATED : August 5, 1975
INVENTOR(S) : Stewart E. Gloyer

It is certified that error appears in the above-identified patent and that said Letters Patent are hereby corrected as shown below:

Column 1, line 41 - "umsaturated" should be --unsaturated--.
Column 2, line 24 - "precent" should be --percent--.
Column 2, line 33 - "thriethyl" should be --triethyl--.
Column 2, line 56 - "to" should be --at--.
Column 3, line 21 - "effeciency" should be --efficiency--.
Column 3, line 35 - "my" should be --any--.
Column 3, line 22 - "affected" should be --effected--.
Column 3, line 46 - "eah" should be --each--.
Column 4, line 26 - "a" (second occurrence) should be "A"

Column 4, line 46 - "phosiphite" should be --phosphite--.
Column 5, line 17 - "aline" should be --alone--.

Claim 1

Column 5, line 32 - "lenght" should be --length--.
Column 5, line 35 - "$C_1$ and $C_8$" should be --$C_1$ to $C_8$--.
Column 5, line 35 - "compounds" should be --compound--.
Column 6, line 36 - after "5" insert --minutes--.
Column 6, line 42 - "b" should be omitted.

Signed and Sealed this sixteenth Day of December 1975

[SEAL]

Attest:

RUTH C. MASON
Attesting Officer

C. MARSHALL DANN
Commissioner of Patents and Trademarks